Aug. 23, 1932.   L. G. COPEMAN   1,872,685
COOLING CHAMBER FOR A MECHANICAL REFRIGERATING UNIT
Filed Aug. 5, 1929   2 Sheets-Sheet 1

INVENTOR.
Lloyd G. Copeman
BY
Stuart C. Barnes
ATTORNEY.

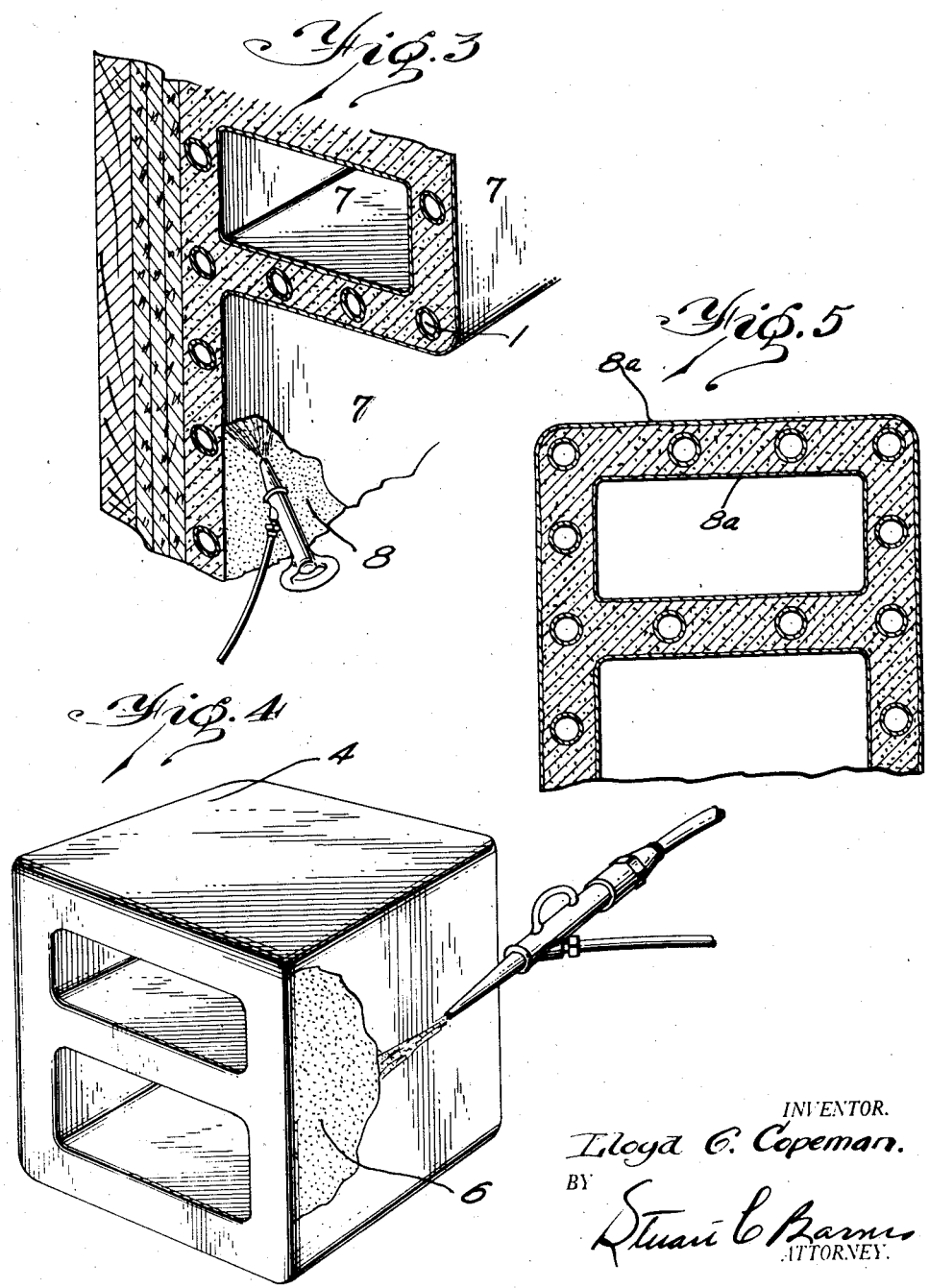

UNITED STATES PATENT OFFICE

LLOYD G. COPEMAN, OF FLINT, MICHIGAN, ASSIGNOR TO COPEMAN LABORATORIES COMPANY, OF FLINT, MICHIGAN, A CORPORATION OF MICHIGAN

COOLING CHAMBER FOR A MECHANICAL REFRIGERATING UNIT

Application filed August 5, 1929. Serial No. 383,695.

This invention relates to a cooling chamber for a mechanical refrigerating unit, and has to do particularly with a novel method of forming the interior walls of the cooling chamber and sharp freezing chambers of the type of cooling unit as described in my copending application No. 116,321, filed June 16, 1926, now Patent No. 1,816,638 of July 28, 1931.

The forming of the refrigerating chamber and particularly the sharp freezing unit of plastically applied stone allowed to set, has proven very satisfactory in that it provides an exceedingly inexpensive refrigerating and sharp freezing chamber construction, has a very pleasing or "cold" appearance, and provides a very efficient hold-over as well as a conductor. However, the surfaces of such refrigerating chamber and sharp freezing chamber, which are preferably formed of artificial stone, preferably oxy-chloride cement, have presented some problems in the mixing and setting of the stone in that such surfaces should be practically non-porous and present a very smooth appearance.

I have completely solved this problem in one way by providing a fired stone lowside or cooling chamber, but the present invention resides in the use of very inexpensive and relatively rough artificial stone for forming the main walls of the sharp freezing chamber and/or refrigerating chamber, and then applying a coating of metal which may be sprayed directly on the stone surface by what is known as the Shoupe process.

More specifically, I have discovered that it is possible to spray a thin coat of metal evenly and permanently over the desired surfaces of the chambers formed by the artificial stone, the plastically applied metal permanently adhering to the stone by reason of a roughness imparted to the stone such as by first spraying or coating the same with a sand blast. The stone is plastically applied in the ordinary manner either in the form of a separate sharp freezing unit or in the form of a refrigerating chamber with a sharp freezing unit formed integrally therewith, the cooling means, of course, being embedded or positioned in heat conducting relation with a portion or all of the stone walls. After such stone is set it forms a more or less smooth surface and in order to prepare this surface so as to make it receptive to the plastically applied metal, I preferably roughen the same by subjecting the surface to a sand blast or similar medium.

In the drawings:

Fig. 3 is a fragmentary perspective view of a portion of a refrigerating chamber and sharp freezing chamber and illustrating conventionally the method of applying the coating of metal thereto.

Fig. 4 is a perspective view illustrating the coating of the removable sharp freezing container.

Fig. 5 is a sectional view showing the metal coating covering the inner and outer surfaces of the removable sharp freezing unit.

In illustrating the present invention, I have shown the same as being embodied in connection with the fabrication of a domestic refrigerating unit, but it will be understood that the present invention may be used and embodied in various types of refrigerating units.

Figure 1:
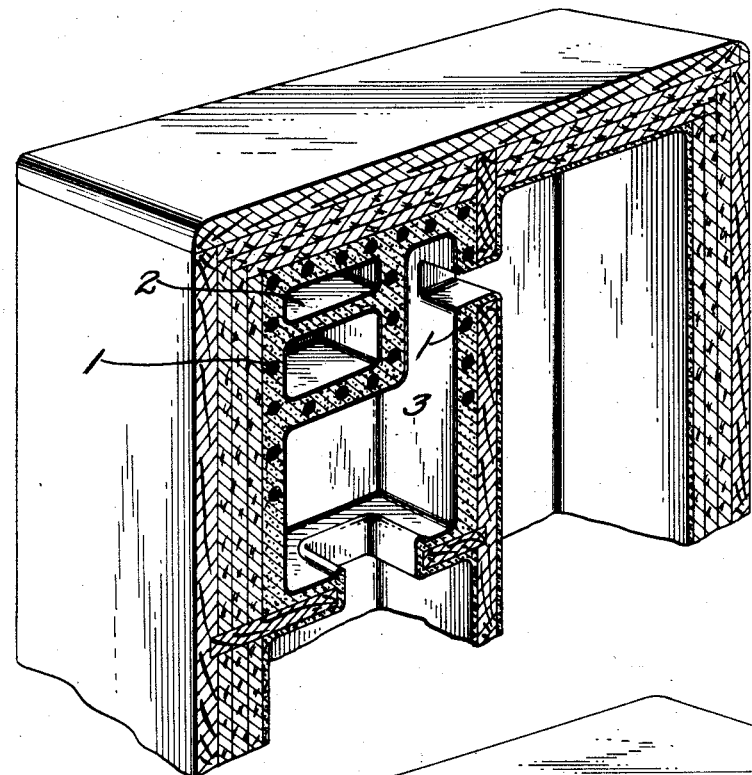
Fig. 1 is a perspective sectional view of a refrigerating unit of the type having food compartments together with a refrigerating chamber and sharp freezing chamber, and embodying the present invention.

In building up a unit of the type illustrated in Fig. 1, the refrigerant conducting coils 1 may be positioned as desired and artificial stone, preferably formed of oxy-chloride cement, plastically applied in a suitable manner to form the walls 2 of the sharp freezing chamber and the walls 3 of the refrigerating chamber. After the stone walls are set, a more or less smooth surface will be formed on the interior exposed walls regardless of whether the chambers are formed by means of a core or by troweling the stone.

I next preferably roughen the exposed surfaces of the chambers by spraying the same with a sand blast or by any other suitable roughening means. The walls having been roughened, I then preferably apply a coating of plastic metal by what is known as the Shoupe process. By this process the metal is plastic or sufficiently molten to be sprayed, and in the present instance I may use a large variety of metals for forming the metal coating, such as zinc, German silver, and similar metals. This metal solidifies almost instantly and leaves a permanent non-porous surface coating which has a very pleasing appearance and which renders the cooling unit and the refrigerating chamber completely non-porous.

In other words, the sharp freezing unit and cooling chamber may be formed of cast stone so as to obtain all the benefits of manufacture and resulting efficiency in operation and can be indefinitely preserved by the application of a thin metal coating which protects but does not detract in any way either from the structural characteristics or the physical properties of the stone mold.

Figure 2:
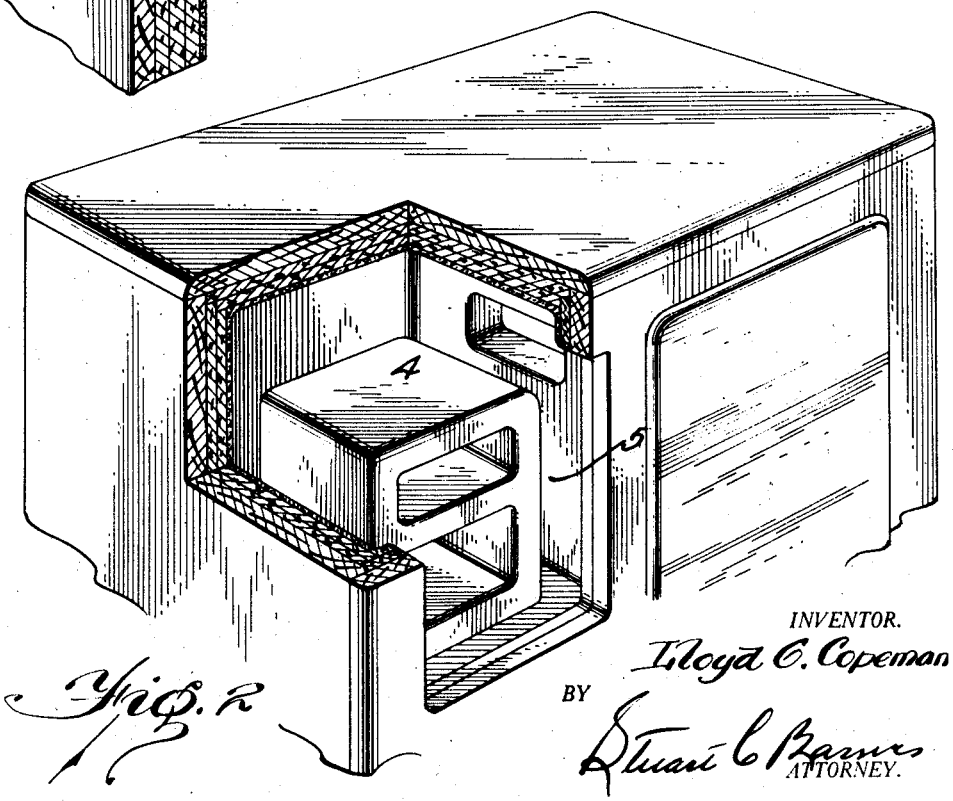
Fig. 2 is a perspective view, partly cut away, of a similar refrigerating unit wherein the sharp freezing chamber is positioned as a unit with the cooling chamber.

In Fig. 2 I have illustrated the invention as embodied in a sharp freezing unit 4 adapted to be inserted as a unit in the cooling chamber 5 of a domestic refrigerating unit. In this case I preferably only roughen the walls of the unit itself as at 6, and spray this integral unit only instead of the walls of the cooling chamber 5.

In Fig. 3 I have conventionally illustrated the method of applying the metal coating 7 to the roughened walls 8 of the refrigerating chamber, the metal being shown applied to the interior and exterior walls of the sharp freezing chambers. In Fig. 5 I have conventionally shown the integral cooling unit with the thin layer of metal 8a applied to the roughened interior and exterior walls of the sharp freezing unit.

I have found that when the metal has been sprayed directly on the roughened surfaces of the stone that the metal fills in all the small interstices and really becomes a permanent part of the stone wall.

What I claim is:

1. A refrigerating unit of the mechanical refrigeration type, comprising a cooling chamber formed of plastically applied stone allowed to harden, and a monolithic thin surface layer of metal permanently secured to the said stone to seal the same from the atmosphere.

2. A cooling unit of the sharp freezing type, comprising walls formed of a plastically applied and allowed to harden, said walls being positioned in heat conducting relation with refrigerant conducting means, and a surface layer for said unit formed of plastically applied metal allowed to set.

3. A cooling unit of the sharp freezing type, comprising walls formed of a plastically applied material allowed to harden, said material having good hold-over and conductive properties and said walls being positioned in heat conducting relation with refrigerant conducting means, and a thin layer of metal adhesively secured to the exposed surfaces of said walls for sealing the same.

In testimony whereof I affix my signature.

LLOYD G. COPEMAN.